March 17, 1959      F. N. EATON      2,877,732
JOINT FOR CONNECTING SECTIONS OF TORPEDOES
OR OTHER CYLINDRICAL VESSELS
Filed Sept. 25, 1953      2 Sheets-Sheet 1
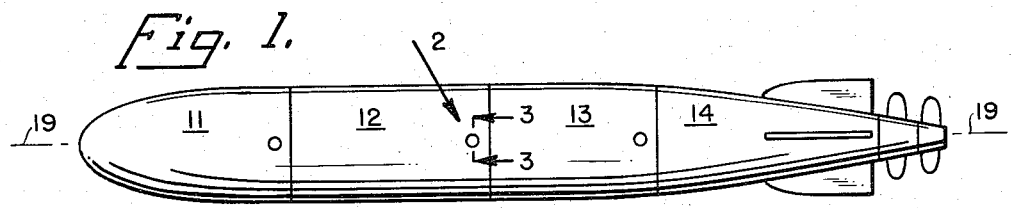
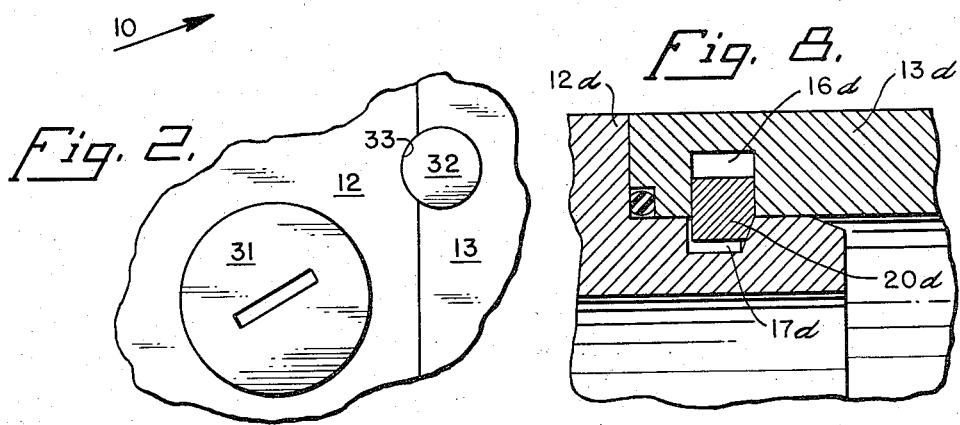
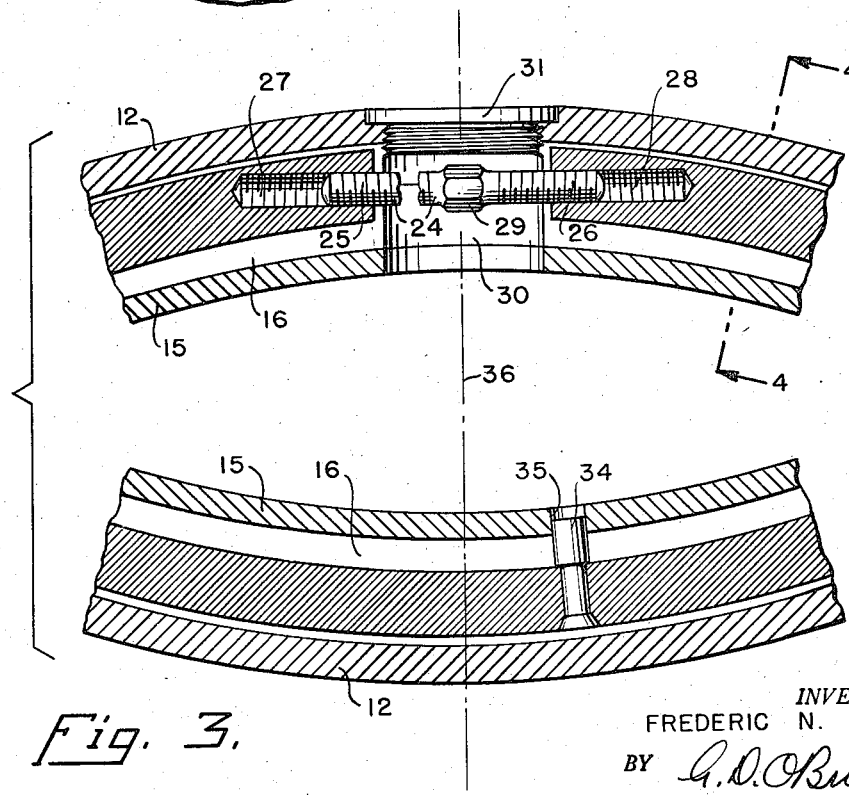
INVENTOR.
FREDERIC N. EATON
BY
ATTORNEYS March 17, 1959 F. N. EATON 2,877,732
JOINT FOR CONNECTING SECTIONS OF TORPEDOES
OR OTHER CYLINDRICAL VESSELS
Filed Sept. 25, 1953 2 Sheets-Sheet 2

INVENTOR.
FREDERIC N. EATON
BY
ATTORNEYS

United States Patent Office 2,877,732
Patented Mar. 17, 1959

2,877,732

JOINT FOR CONNECTING SECTIONS OF TORPEDOES OR OTHER CYLINDRICAL VESSELS

Frederic N. Eaton, Pasadena, Calif.

Application September 25, 1953, Serial No. 382,489

2 Claims. (Cl. 114—22)

(Granted under Title 35, U. S. Code (1952), sec. 266)

The invention described herein may be manufactured and used by or for the Government of the United States of America for governmental purposes without the payment of any royalties thereon or therefor.

This invention relates to improvements in joint devices for locking adjacent tubular members together, such as adjacent sections of torpedoes.

In torpedoes it is common practice to form the torpedo shell in sections, which are secured together by various devices such as circumferentially spaced bolts, channel shaped clamping bands, bayonet connections, etc. Such devices have disadvantages in that they are complicated, bulky, difficult to construct and assemble, and do not provide optimum streamlining of the exterior surface of the shell.

One of the objects of the invention is to provide improved joints which obviate the aforesaid and other disadvantages of joints of the type referred to.

Another object is to provide joints of the foregoing type which are of general utility and may be employed to lock together various hollow members, other than torpedoes.

Another object is to provide improved expansible or contractible joint rings associated with hollow members in such manner that they are subjected principally to shear stresses when the members are subjected to longitudinal tension or flexible therebetween, in contradistinction to joints of the type wherein the locking member or members are subjected to tension.

Another object is to provide joint rings of the foregoing types, associated with the members in such manner that the wall thickness of a member at the joint is minimized, thus providing increased internal diameter at the joint, but without sacrifice of strength thereat.

Still further objects, advantages and salient features will become more apparent from the description to follow, the appended claims, and the accompanying drawing, in which:

Fig. 1 is a side elevation of a plurality of tubular members, exemplified as a torpedo shell, employing the subject of the invention;

Fig. 2 is an enlarged detail of Fig. 1 in the area thereof indicated by arrow 2;

Fig. 3 is an enlarged fragmentary and broken away section taken on line 3—3, Fig. 1;

Fig. 8 is a section, similar to Fig. 4, illustrating a contractible ring which may be employed in lieu of an expansible ring shown in the other figures.

Figure 4:
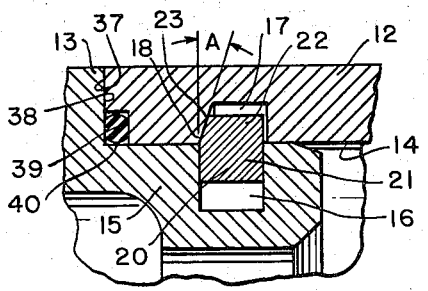
Fig. 4 is a section taken on line 4—4, Fig. 3, illustrating a locked position of parts.

Referring in detail to the drawing, and particularly Figs. 1 to 4A, torpedo 10 comprises a plurality of axially aligned tubular sections 11, 12, 13, 14 forming the shell of the torpedo, any adjacent pairs of which may be secured together by the subject of the invention. As best shown in Fig. 4, sections 12 and 13, as an example, are provided, respectively, with a female portion 14 and a male portion 15, the latter having a cylindrical outer surface which telescopes within the bore of the female portion during assembly of the joints. Portion 15 is provided with a circumferentially extending outwardly open channel 16, rectangular in cross section, and section 13 is provided with a mating inwardly open channel 17 trapezoidal in cross section, one face 18 of which forms an angle A to a plane perpendicular to the longitudinal axis 19 of the torpedo. An expansible split ring 20 is disposed within channels 16, 17, a rectangular portion 21 thereof being within channel 16 and a trapezoidal portion 22 thereof within channel 17, beveled face 23 of the ring abutting beveled face 18 of channel 17. Ends of split ring 20, as best shown in Fig. 3, are connected by a turnbuckle 24 having right and left hand threaded portions 25, 26 threadedly engaging corresponding threaded apertures 27, 28 in the ends of the ring. The central portion 29 of the turnbuckle is non-circular in cross section for receiving a wrench which may be inserted and turned within access aperture 30, normally closed by a suitable plug 31. As best shown in Fig. 2, a dowel 32, carried by section 13, engages a suitable depression 33 in section 12 to effect alignment of the sections, and as best shown in Fig. 3, a dowel 34, secured to the ring, and engaging an aperture 35 in portion 15 of section 13 prevents unauthorized rotation of the ring within the grooves. Dowel 34 is angularly displaced from a diametrical line 36 to prevent accidental reversal during installation of the ring in channel 16. As will be apparent, if reversed, portion 29 of the turnbuckle will not be disposed in an accessible position to turn same, hence it is impossible to improperly assemble the various parts.

Figure 4A:
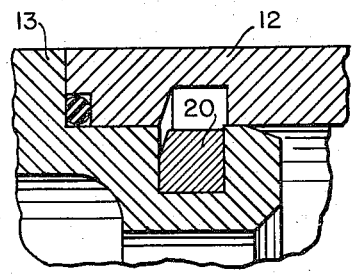
Fig. 4A is a section like Fig. 4 illustrating an unlocked position of parts.

To effect installation of ring 20 in channel 16, turnbuckle 24 is removed from the ring and the latter expanded sufficiently to permit its insertion in groove 16 after which the turnbuckle is applied to the ring and the latter contracted so that both inner and outer portions 20, 21 are disposed within channel 16, as best shown in Fig. 4A. Assembly of the joint is effected by moving sections 12, 13 relatively toward each other until end faces 37, 38 nearly touch and with dowel 32 aligned with depression 33. The ring is then expanded by rotating the turnbuckle until the ring is finally disposed in the position shown in Fig. 4A. As it approaches this position face 23 engages face 18 and the wedging action closes the gap between end faces 37, 38 of the sections at the same time pressurizing O ring 39 which is disposed in an annular groove 40 in member 12, the ring preventing fluid leakage between opposite sides of the walls of the sections. Plug 31 is then applied to section 12 closing access aperture 30. To disassemble, the foregoing procedure is merely reversed.

Figure 5:
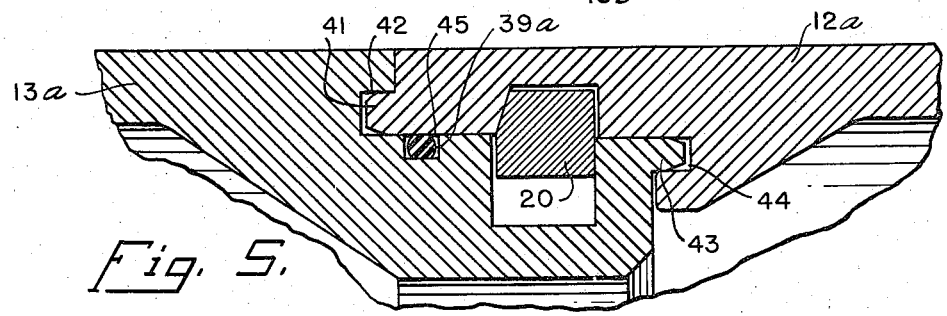

In Fig. 5 an alternative reinforced construction is illustrated wherein section 12a is provided with an annular tongue or flange 41 disposed within a mating groove 42 in section 13a and section 13a is provided with a similar tongue 43 disposed within a mating groove 44 in section 12a. An alternative position of O ring 39a is also illustrated, this being disposed in an outwardly opening annular groove 45 in section 13a.

Figure 6:
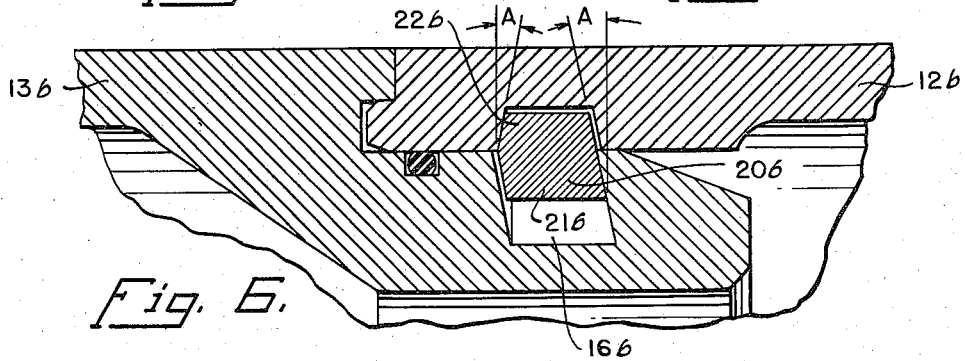
Figs. 5, 6 and 7 are sections like Fig. 4, showing various alternative forms of the invention, all shown in locked position of parts.

Fig. 6 illustrates that one of the tongues just described may be omitted if desired and also illustrates an alternative form of ring 20b having an inner portion 21b of parallelogram cross section and an outer portion 22b of isosceles trapezoid cross section. In this construction, the side faces of groove 16b are both disposed at an angle A to planes perpendicular to the longitudinal axis of the vessel instead of parallel, as in the construction previously described. It will be apparent, therefore, that with a wedging angle A on the outer portion of the ring and a wedging angle A in groove 16b, the wedging angle is increased to 2A, that is, with a predetermined increment of expansion of the ring the relative axial movement between the sections will be doubled over the ring and groove construction previously described. Angles A, A may, of course, be chosen as desired and need not be equal to each other or equal to angle A in Fig. 4.

Figure 7:
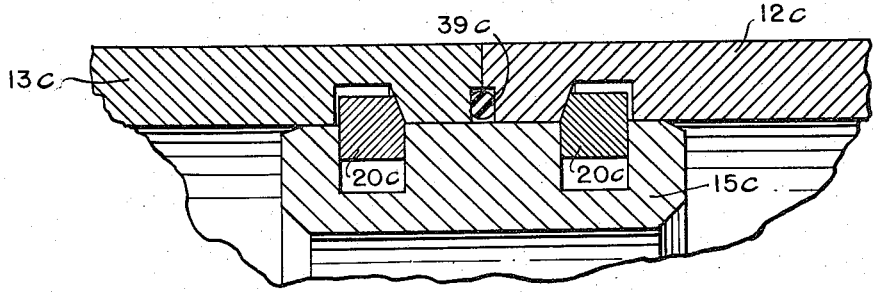

Fig. 7 illustrates a construction similar to that of Figs. 1 to 4A with the exception that portion 15c is formed as a separate sleeve instead of an integral portion of section 13c and secured to the latter by a ring 20c in the same manner that the other ring 20c is secured to section 12c. This construction permits joining of tubes of uniform wall thickness and obviates the integral male portion 15 previously described. In this construction O ring 39c is disposed in a pair of mating grooves, one in each section. As an alternative form of the construction illustrated in Fig. 7 one of the split rings may be constructed rectangular in cross section, rather than with a beveled face, and the channel into which it expands constructed to receive the rectangular ring. In such construction, the ring would serve only as a keying member to prevent axial movement between member 15C and one of members 12C or 13C, and the wedging action would be effected by the other ring, only. It will be apparent, also, that only one access opening, such as aperture 30, need be provided in the construction illustrated in Fig. 7 since one of the turnbuckles may be rendered accessible from the inside of the vessel and one ring expanded to its proper position prior to assembly of the adjacent aligned sections of the vessel. In a further alternative construction, sleeve 15C may surround members 12C, 13C.

Fig. 8 illustrates an alternative form of the invention in which ring 20d effects locking of adjacent sections 12d, 13d by contraction rather than by expansion. In this construction the rectangular channel 16d is in the female member 13d and trapezoidal channel 17d is in the male member, rather than in the male and female members, respectively, as in the previous figures.

As will be apparent, the various illustrations are exemplary only and any of the desirable features of any figure may be employed in any of the other figures thus rendering possible many combinations of location of O rings, tongue and groove interlocks, expansible or contractible rings, etc. It is to be understood, accordingly, that the invention is not limited to any specific illustrated embodiment thereof except as defined by the appended claims.

What is claimed is:

1. Apparatus in combination comprising; a pair of circular tubular members, one of said members having a male portion with a cylindrical outer surface adjacent an end of same adapted to telescope within a cylindrical bore of a mating female portion adjacent one end of the other member, an outwardly open circumferentially extending channel in said male portion, an inwardly open circumferentially extending channel in said female portion substantially surrounding the channel in the male portion when the members are disposed in telescoped position, a flexible split ring adapted to be contained in a first position within one of said channels when the members are separated to permit the telescopic movement therebetween during assembly thereof, said ring and at least one of said channels having engageable mating beveled faces constructed and arranged to wedgingly effect telescopic movement of the members toward each other when the ring is moved to a second position wherein it is disposed within both channels, means for moving the ring from the first to the second position and positively retaining it thereat against retrograde movement toward the first position, a circumferentially extending annular surface on an end of the male portion adapted to abut a mating annular surface on the female portion, the abutting surfaces forming a joint extending transversely of the axis of the two members and terminating at the outer surface of said portions, said portions being substantially the same exterior diameter adjacent the termination of the joint to provide a smooth continuous exterior surface thereon an end of the female portion being provided with an annular projection adapted to telescope within a mating annular recess in the male portion, at least a portion of the annular projection on the female portion adapted to be subjected to radial shear forces when said members are subjected to radial loading forces.

2. Apparatus in accordance with claim 1 wherein said circular tubular members are adjacent shell sections of a torpedo.

References Cited in the file of this patent
UNITED STATES PATENTS

| 1,733,549 | Miller | Oct. 29, 1929 |
| 2,616,587 | Petch | Nov. 4, 1952 |
| 2,687,910 | Petch et al. | Aug. 31, 1954 |
| 2,749,162 | Humphrey | June 5, 1956 |

FOREIGN PATENTS

| 594,265 | France | Sept. 9, 1925 |